US007086151B2

(12) United States Patent
Scancarello

(10) Patent No.: US 7,086,151 B2
(45) Date of Patent: Aug. 8, 2006

(54) POWDER METAL SCROLLS

(75) Inventor: Marc J Scancarello, Troy, OH (US)

(73) Assignee: Copeland Corporation, Sidney, OH (US)

(*) Notice: Subject to any disclaimer, the term of this patent is extended or adjusted under 35 U.S.C. 154(b) by 227 days.

(21) Appl. No.: 10/761,112

(22) Filed: Jan. 20, 2004

(65) Prior Publication Data

US 2004/0146423 A1 Jul. 29, 2004

Related U.S. Application Data

(62) Division of application No. 10/056,165, filed on Jan. 24, 2002, now Pat. No. 6,705,848.

(51) Int. Cl.

| | |
|---|---|
| ***B23P 15/00*** | (2006.01) |
| ***B23P 25/00*** | (2006.01) |
| ***F04B 17/00*** | (2006.01) |
| ***F01C 1/02*** | (2006.01) |
| ***B22F 3/00*** | (2006.01) |

(52) U.S. Cl. .............................. 29/888.022; 29/527.1; 29/527.2; 417/410.5; 418/55.2; 418/179; 419/45

(58) Field of Classification Search ............. 29/888.02, 29/888.022, 458, 527.3, 526.2; 418/55.2, 418/179; 75/231, 230; 148/321, 514, 651, 148/528, 559; 419/31, 45, 11, 49, 10; 228/253, 228/178; 415/184; 417/410.3–410.5; 420/442, 420/473, 443; 428/676, 548, 550, 615

See application file for complete search history.

(56) References Cited

U.S. PATENT DOCUMENTS

| | | | | |
|---|---|---|---|---|
| 3,600,114 | A | | 8/1971 | Dvorak et al. |
| 4,029,476 | A | | 6/1977 | Knopp |
| 4,550,480 | A | | 11/1985 | Tanikawa et al. |
| 4,838,936 | A | * | 6/1989 | Akechi ........................ 75/249 |
| 4,944,663 | A | | 7/1990 | Iizuka et al. |
| 4,958,993 | A | | 9/1990 | Fujio |
| 5,051,079 | A | * | 9/1991 | Richardson, Jr. .......... 418/55.2 |
| 5,392,512 | A | | 2/1995 | Fann et al. |
| 5,478,220 | A | | 12/1995 | Kamitsuma et al. |
| 5,534,220 | A | | 7/1996 | Purnell et al. |
| 5,580,401 | A | * | 12/1996 | Williamson ................. 148/321 |
| 5,594,186 | A | * | 1/1997 | Krause et al. ................ 75/228 |
| 6,079,962 | A | | 6/2000 | Seibel et al. |
| 6,106,252 | A | | 8/2000 | Yamanaka et al. |
| 6,129,530 | A | | 10/2000 | Shaffer |
| 6,139,294 | A | | 10/2000 | Haller |
| 6,139,295 | A | | 10/2000 | Utter et al. |
| 6,143,241 | A | | 11/2000 | Hajaligol et al. |
| 6,146,118 | A | | 11/2000 | Haller et al. |
| 6,171,084 | B1 | | 1/2001 | Wallis et al. |
| 6,176,094 | B1 | | 1/2001 | Ohta et al. |
| 6,196,814 | B1 | | 3/2001 | Cooksey et al. |
| 6,299,424 | B1 | * | 10/2001 | Futagami et al. .......... 418/55.2 |
| 6,302,665 | B1 | | 10/2001 | Esumi et al. |

(Continued)

FOREIGN PATENT DOCUMENTS

| | | | |
|---|---|---|---|
| EP | 0053301 | * | 5/1981 |

(Continued)

*Primary Examiner*—George Nguyen
*Assistant Examiner*—Douglas E. Mazzuca, Jr.
(74) *Attorney, Agent, or Firm*—Harness, Dickey & Pierce, P.L.C.

(57) ABSTRACT

Scrolls made from one or more near-net shaped powder metal processes either wholly or fabricated together from sections. Both “conventional” press and sinter methods and metal injection molding methods will be described.

28 Claims, 10 Drawing Sheets

U.S. PATENT DOCUMENTS

2002/0025269 A1 2/2002 Esumi et al.

FOREIGN PATENT DOCUMENTS

| | | | |
|---|---|---|---|
| JP | 57-135291 | | 8/1982 |
| JP | 58-126492 | | 7/1983 |
| JP | 59-192881 | | 11/1984 |
| JP | 61-226589 | | 10/1986 |
| JP | 02-151341 | | 6/1990 |
| JP | 2-173378 | | 7/1990 |
| JP | 05161947 | * | 12/1991 |
| JP | 06-128666 | | 5/1994 |
| JP | 07-090323 | | 4/1995 |
| JP | 07-090324 | | 4/1995 |
| JP | 07-090510 | | 4/1995 |
| JP | 07-090511 | | 4/1995 |
| JP | 07-090512 | | 4/1995 |
| JP | 07-188829 | | 7/1995 |
| JP | 07-197213 | | 8/1995 |
| JP | 11-336674 | | 12/1999 |

* cited by examiner

POWDER METAL SCROLLS

CROSS-REFERENCE TO RELATED APPLICATIONS

This application is a divisional application of U.S. patent application Ser. No. 10/056,165, filed on Jan. 24, 2002 now U.S. Pat. No. 6,705,848. The disclosure of the above application is incorporated herein by reference.

FIELD OF THE INVENTION

This invention relates generally to compressors and refers more particularly to a method for forming components of a compressor.

BACKGROUND AND SUMMARY OF THE INVENTION

The current method of manufacturing scrolls is derived from a molten metal process ("casting"). Typically, the liquid gray cast iron is specially alloyed, inoculated, and poured into a cavity that then forms the scroll after solidification is complete. The current casting process produces a raw casting scroll with linear dimensional accuracy of about +/−0.020 inch per inch. Moreover, because of intrinsic metallurgical surface anomalies or defects caused by casting, extra machining stock (about 0.060 inch) must be added in addition to this tolerance resulting in about 0.060+/−0.020 inch total stock and variation to be machined off. The skin effect is produced because of the complicated thermodynamic, kinetic and metallurgical/chemical interactions that take place at the solidifying and cooling sand (or ceramic) to metal interface.

Molds used in the casting process, in which the molten metal flows into, are composed of sand, binder, and/or a ceramic coating and are not fully structurally rigid. When the liquid iron contacts the mold wall surfaces, pressure is exerted on the mold, which causes mold wall expansion. Gray cast iron is especially prone to solidification expansion because of the high carbon or graphite content. This phenomenon is a major source of dimensional variation and tolerance increases, as stated.

Scrolls, to perform properly, must not leak, wear out or fracture, so very accurate final dimensions must be held. To accomplish this, very extensive, complicated and expensive machining takes place on the raw castings to convert them into a useable scroll with the current casting manufacturing approach. Therefore, because of the aforementioned capability of the current casting processes, the excessive machining stock presents a major impediment to high volume productivity because of the shear amount of material needed to be machined off. The region of the scroll that is the most difficult to machine is the involute scroll form itself. Milling of this portion causes the most tool wear and takes the longest time to machine. The dimensional accuracy in the "involute scroll form" is, therefore, the most important.

The two fundamental types of powder metal manufacturing processes described herein enable the manufacturing of scroll with less "skin effect" layer and better dimensional tolerances while still meeting the rigorous stress and pressure requirements needed for a functioning scroll. They are metal injection molding and conventional press and sinter powder metallurgy. Both processes will have embodiments associated with them that will make the use of powder metallurgy practical and useful for manufacturing of near nets or net shaped scrolls. The scroll is either formed wholly or formed in parts and then joined to make the entire scroll component.

In general, the invention is directed towards the use of powder metals in the formation of a scroll component for a scroll compressor. It is envisioned that the entire scroll component can be formed utilizing powder metal techniques. Is further envisioned, that portions of the scroll compressor members can be produced utilizing powder metallurgy techniques. These portions such as the scroll's involute component, which requires an extremely high degree of dimensional tolerance, are then fastened to other portions of the scroll component which are formed by techniques such as casting, forging, or even another powdered metal part.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
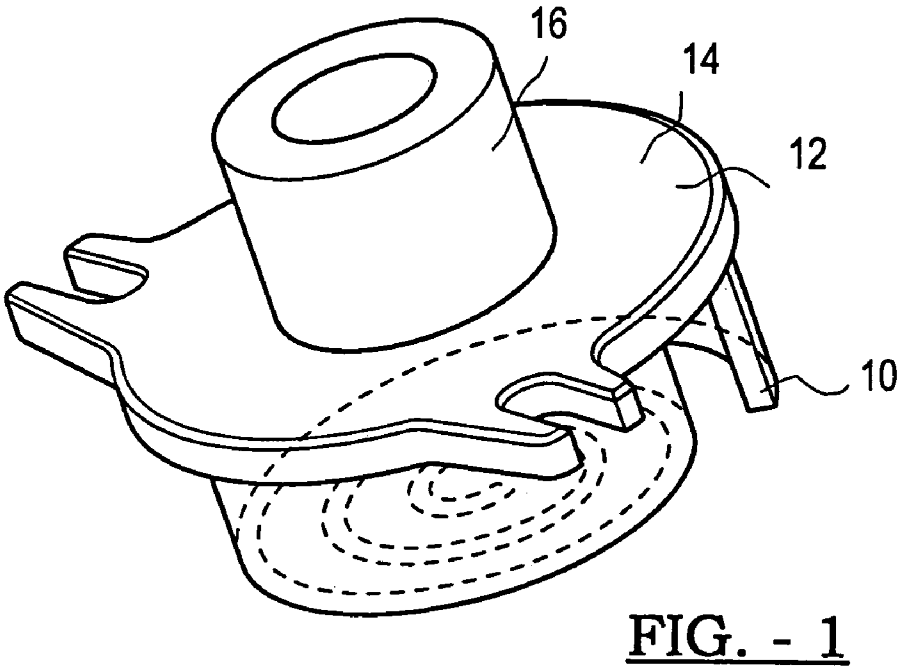
FIGS. 1–2 are scroll components in accordance with the present invention.
Figure 2:
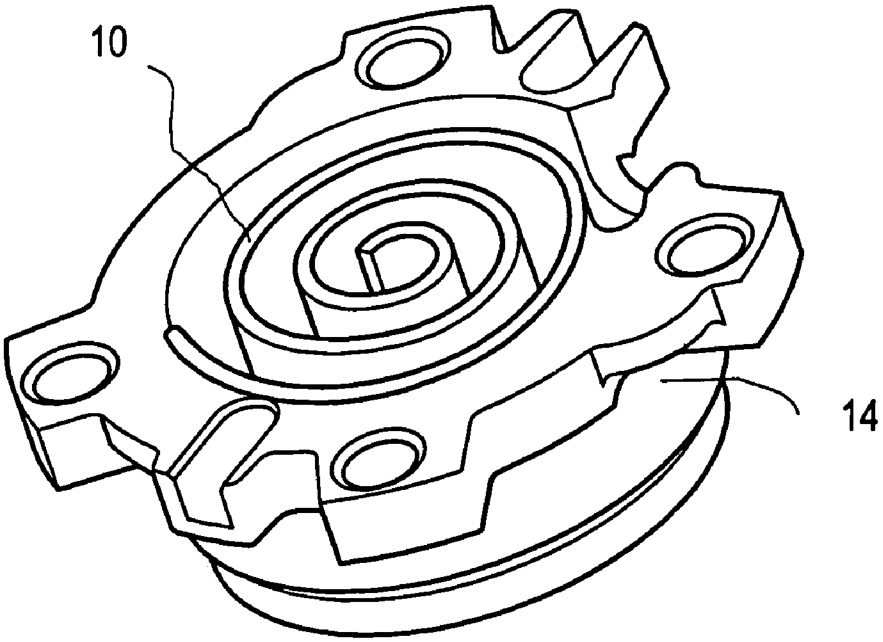

Reference will now be made to the drawings, wherein the showings are for the purpose of illustrating the preferred embodiments of the invention only and not for the purpose of limitation. FIGS. 1–2 illustrate perspective views of the scroll components produced in accordance with the present invention.

The involute scroll form 10 is joined to the baseplate 12 which is formed of a base 14 and hub 16. The involute scroll form 10 shown is powder metal and a baseplate 12 is a (Grade 30 minimum) gray iron casting. Preferably, the baseplate 12 should be made with conventional sand casting techniques such as vertically parted processes (DISA, etc.) for economic reasons.

The matrix of baseplate 12 has preferably 90% minimum pearlite, and the flake graphite of about 0.64 mm maximum in length. Inoculation can be used to assure uniformly distributed and adequately sized graphite. It is envisioned that rare earth elements may be added to the powder metal mixture to function as inoculants. Although the level of net shape and dimensional accuracy of the involute scroll form 10 is essential on the incoming part, the baseplate 12 may receive significant post processing machining. Excluding porosity, the matrix of the involute scroll form 10 has preferably 90% minimum pearlite. The presence of graphite in involute scroll form 10 is not essential, but would further enhance wear resistance, if present.

Joining of the powder metal involute scroll form 10 to the gray iron baseplate 12 can be accomplished utilizing either conventional resistance welding, capacitance discharge welding (a variant of resistance welding), brazing, or sinter joining may be used. Capacitance discharge welding is similar to conventional resistance welding, only very high rates of heat input occur. Discharging of capacitors to allow a high current in a short amount of time produce this high heating rate. The key advantage of this welding method is that high carbon materials needed in this application can be welded without deleterious effects (cracking, etc.). Also, this method allows the powder metal components to be welded without any deleterious effects such as liquid weld metal wicking or adverse effects from entrained process fluids in the powder metal voids. Capacitance discharge welding also allows dissimilar metals to be joined, allowing for the tailoring of wear, fatigue, and frictional properties of the involute scroll form 10 without increasing the cost of the baseplate 12.

Figure 3A:
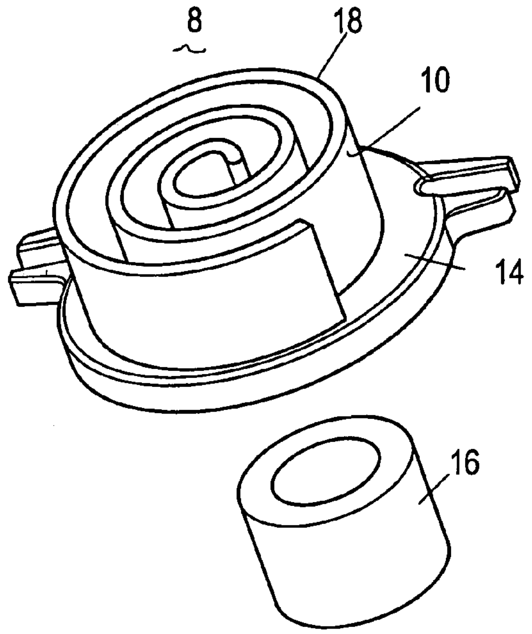
FIGS. 3*a*–3*b* are an exploded perspective view of the scroll component in accordance a second embodiment of the invention.
Figure 3B:
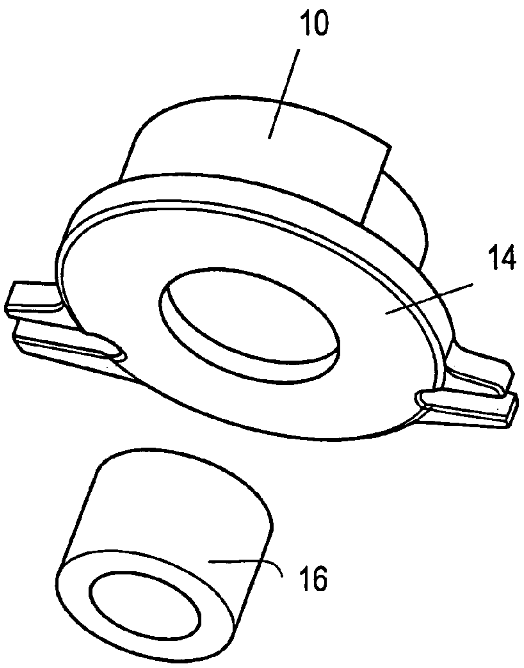

FIGS. 3*a*–3*b* disclose exploded perspective views of a second embodiment of the present invention. Shown are a scroll component 8 having the involute scroll form 10 and base 14 formed out of powder metal techniques as one piece. The hub 16, which is formed separately using the standard sand casting techniques or other forming processes which include powdered metal, previously described, is bonded to the powder metal involute base subassembly 14 into a hub recess utilizing the welding techniques previously described. Preferably, a powder metal hub can be joined to a powder metal baseplate using brazing materials. The green components are assembled and brazed together during the sintering process. Optionally, a solid hub can be fastened that utilizes materials which harden during the sintering process.

Figure 4A:
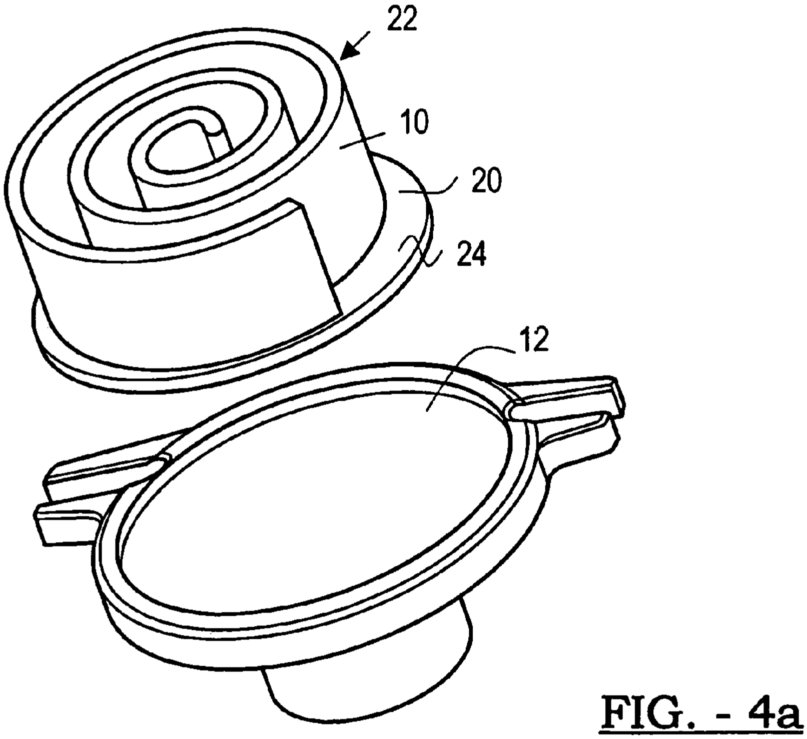
FIGS. 4*a*–4*b* are an exploded perspective view of the scroll component in accordance with a third embodiment of the present invention.
Figure 4B:
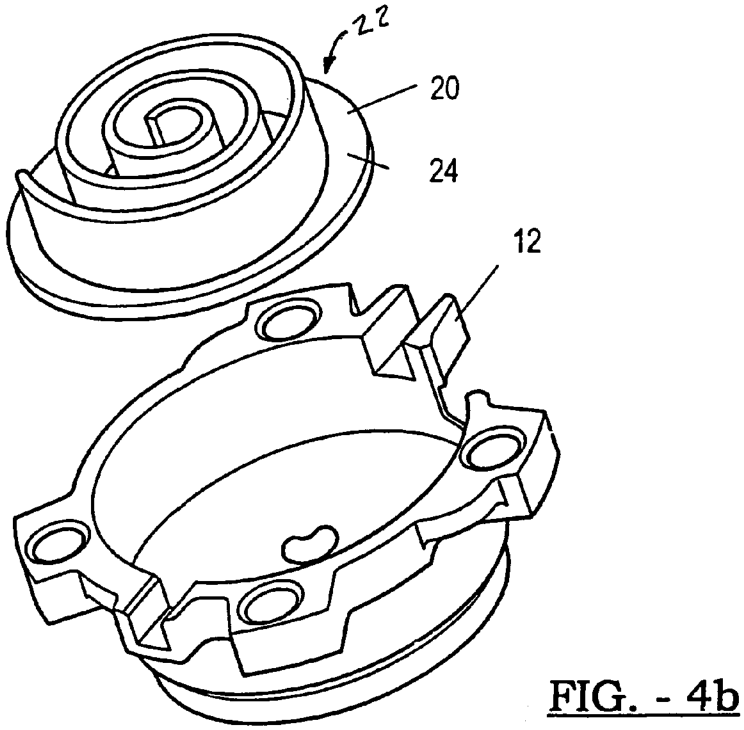

FIGS. 4*a*–4*b* describe a third embodiment of the present invention. Shown is an involute scroll form 10 and palette 20 subassembly 22 formed out of powder metals. The involute palette subassembly 22 is coupled to a baseplate 12 utilizing the aforementioned joining techniques. It should be noted that the formation of the involute palette subassembly 22 allows for very precise formation of the involute scroll form 10 as well as the interfacing surface 24 of the palette 20. Most advantageously, this allows for the inexpensive casting of the base members 12 using conventional low cost techniques.

Figure 5A:
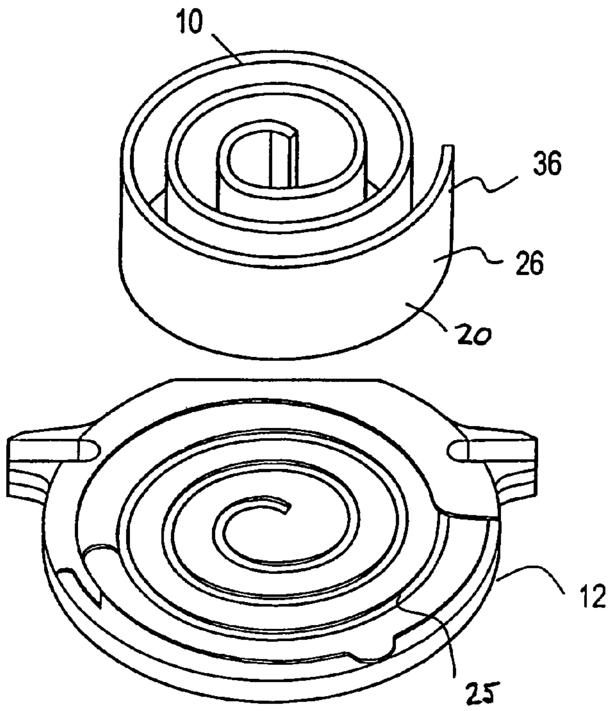
FIGS. 5*a*–5*b* are exploded perspective views of a fourth embodiment of the present invention.
Figure 5B:
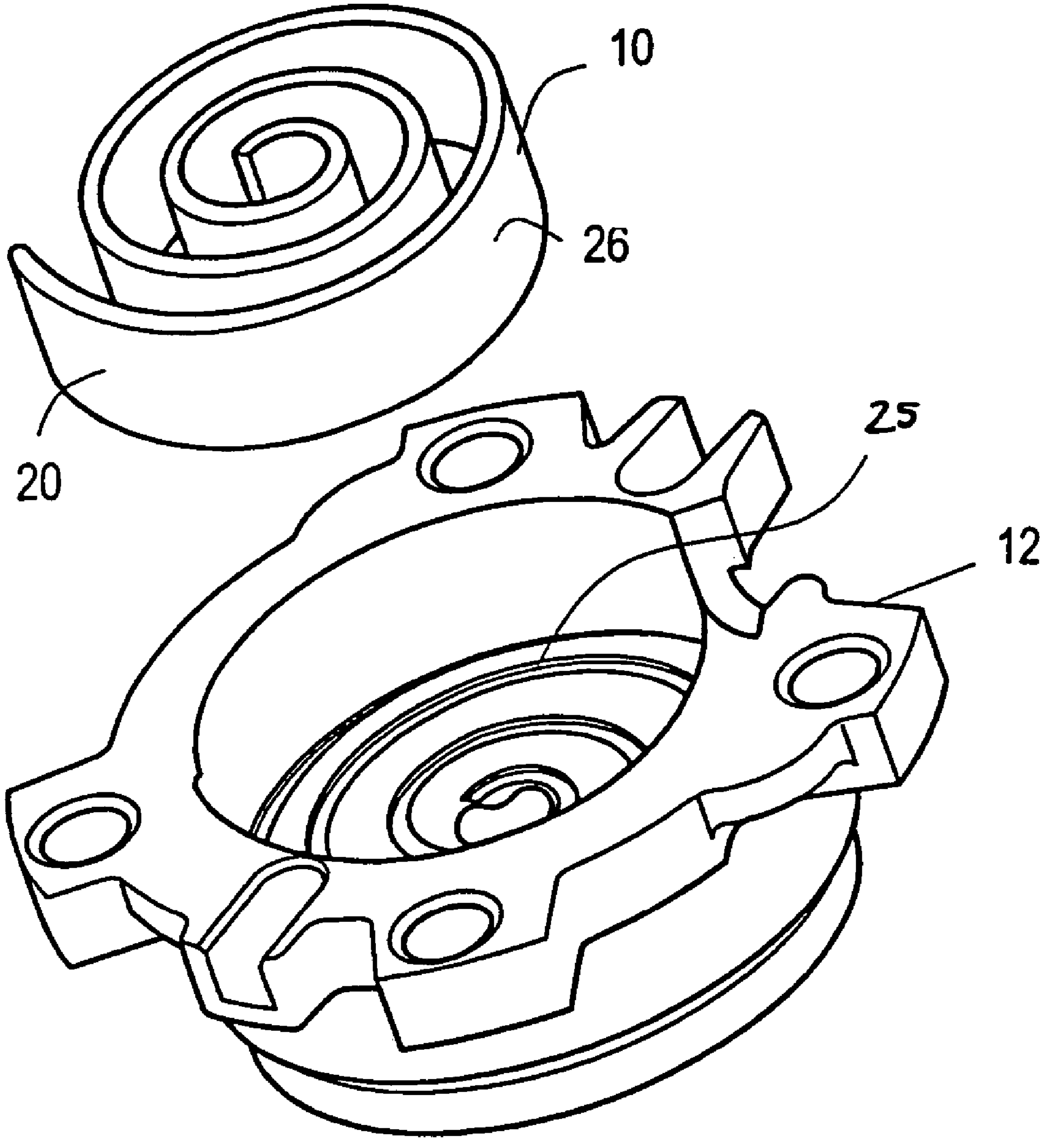

FIGS. 5*a*–5*b* disclose the use of a baseplate groove 25 formed in the base 12 to accept the involute scroll form 10. Baseplate grooves 25 facilitate the dimensional alignment and registration of the involute scroll form 10 to the baseplate 12. Baseplate grooves 25 also enhance the fatigue strength of the involute scroll form 10 at the interface to the baseplate 12. The welding process shall be performed to minimize the hardened zone at the weld interface that may form due to high rates of cooling from the welding temperature. This hardened layer near the weld site may be an origin for cracking due to the local low ductility in the hardened zone. The high rate of heat input and heat removal of capacitance discharge welding helps to minimize this zone's width. Materials with relatively high carbon content are especially susceptible to this phenomenon, such as the material described herein. The baseplate grooves 25 may support the bending moment and help minimize the local strain in the aforementioned hardened zone and lessen the chance of fatigue failure at the joint. Baseplate grooves 25 result in the disadvantage of causing shunting (shorting at the sides of the wrap at the groove wall). A high impedance resistive coating on the involute scroll form 10 or in the baseplate 12 baseplate groove 25 will minimize the shunting effect.

During welding, the entire length of the involute scroll form 10 needs to be welded continuously. This requires a uniform pressure and current along its length. Special fixturing and dimensional accuracy are needed to assure this. Distortion during welding must be minimized by fixturing. Capacitance discharge welding, because of the fast heat input, also affords less distortion.

Figure 7:
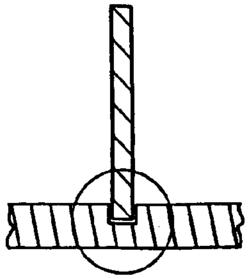
FIGS. 7–7*e* are alternate cross-sections of the scroll involute to base interface.
Figure 7A:
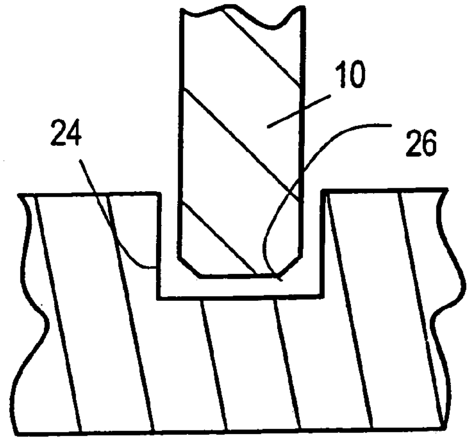
Figure 7B:
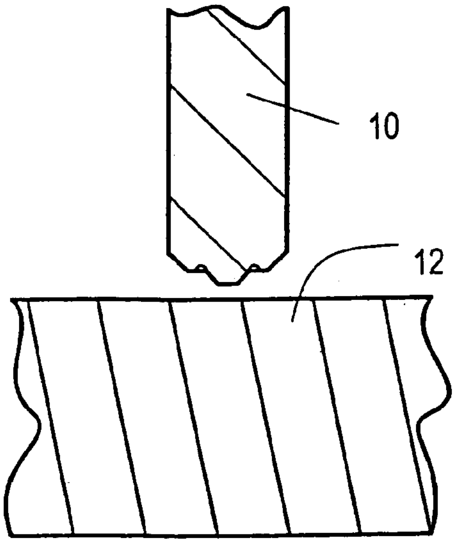
Figure 7C:
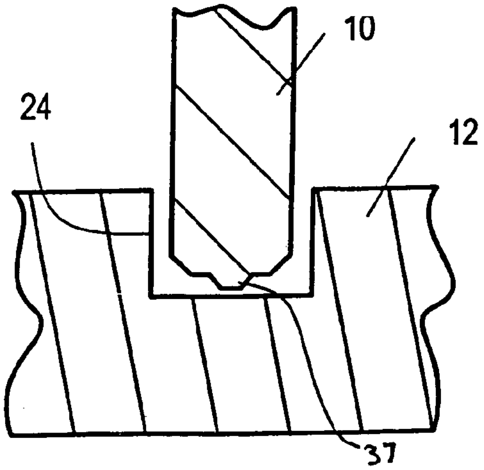

As best seen in FIG. 7*c,* it is preferred a chamfer 26 is molded into the wrap to minimize the edge contacts on the baseplate 12 to correspondingly minimize shunting and to help self align during joining. Resistance welding requires a reduced area projection 37 located at the weld interface. During welding, the projection 37 helps to concentrate the current, which facilitates fusion. The projection 37 partially collapses during welding. The projection 37 may be discrete and positioned at predefined intervals from each other around the wrap or continuous. FIGS. 7*b* and 7*c* are resistance welded. Resistance welding requires a reduced area. During weld, the projection 37 concentrates current and collapses during welding.

Figure 6:
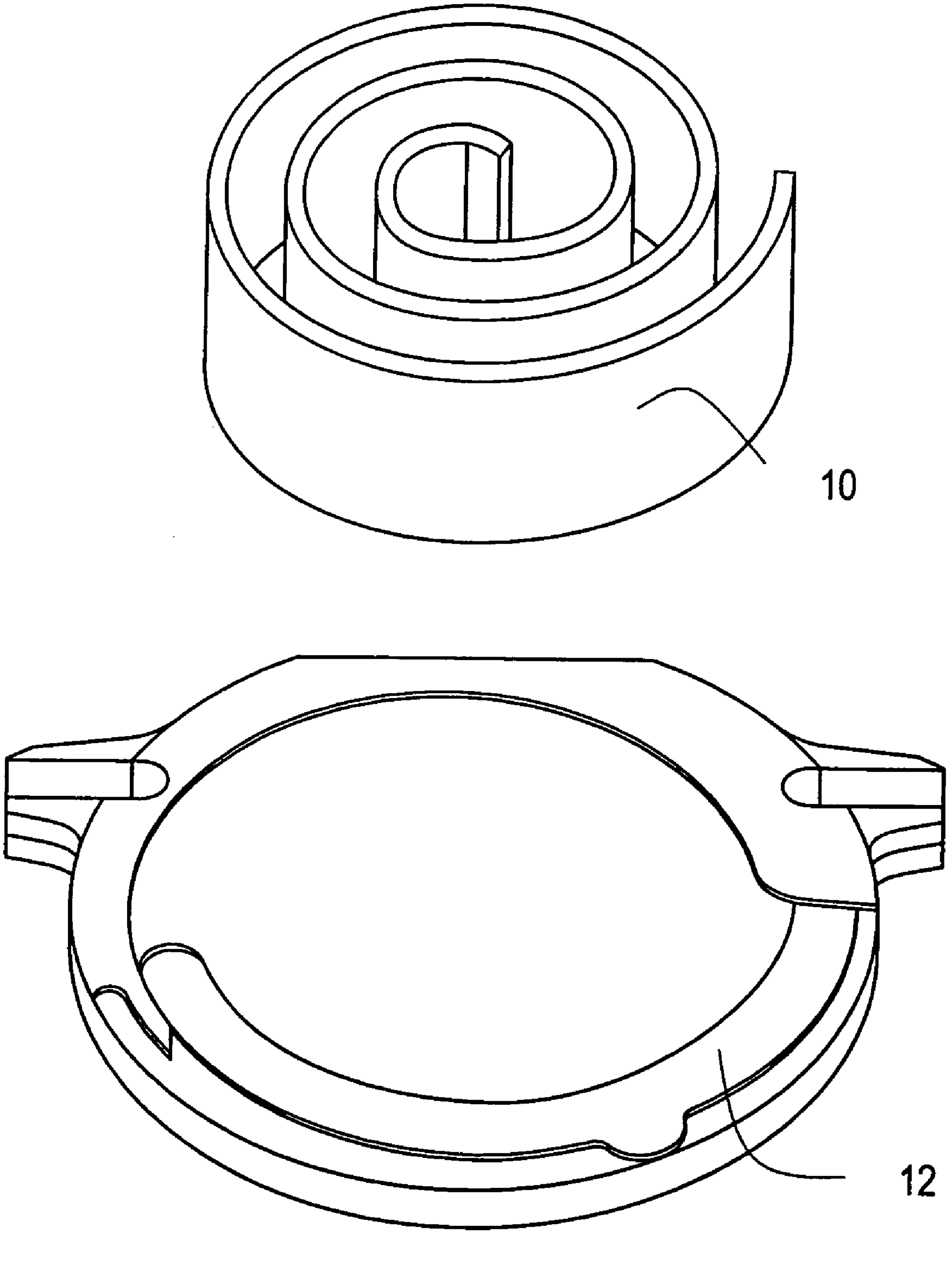
FIG. 6 is an exploded view of a fifth embodiment of the present invention.

Baseplate grooves 25 in the baseplate 12 may be used to register and align the involute scroll form 10 onto the baseplate 12. The baseplate grooves 25 are machined into the gray iron casting prior to joining of the involute scroll form 10 to the baseplate 12. As shown in FIG. 6, it is also possible to align the involute scroll form 10 directly to the baseplate 12 without the use of the baseplate grooves 25. This negates the need for milling the baseplate grooves 25, which is an added expense.

Figure 7D:
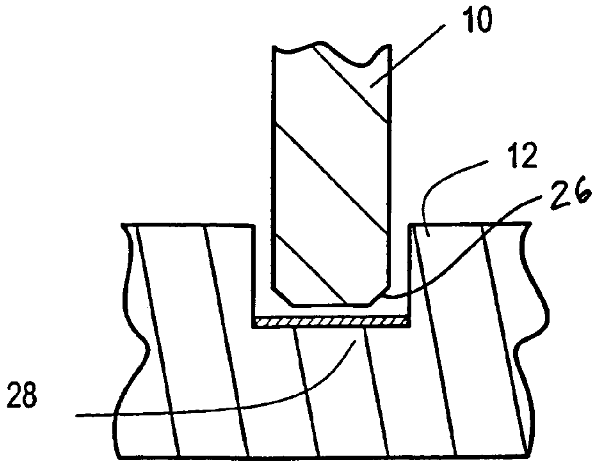
Figure 7E:
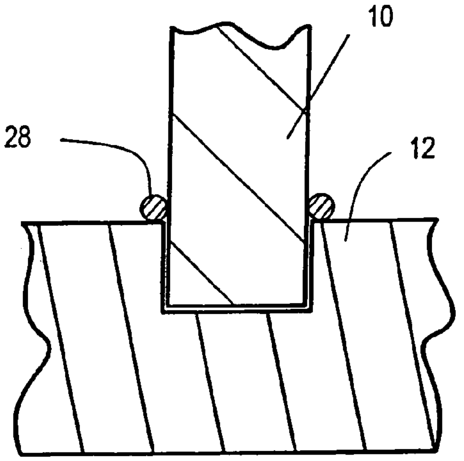

As shown in FIGS. 7*d*–7*e,* it is possible to utilize brazing materials 28 to facilitate the joining of the involute scroll form 10 to the baseplate 12. Additionally, brazing material 28 can be used to join the hub 16 to the back side of baseplate 12 within a hub groove. This approach has the advantage that a hardened zone does to form at the joint interface such as with welding described above. One challenge to brazing materials 28 with graphite in them (such as gray iron or the graphitic powder metal described herein) is that the graphite tends to coat the surface of the metal and retards wetting of the braze material 28. One of the solutions to this problem is to furnace braze within an appropriate atmosphere that allows wetting to occur. Another solution is to use a braze material 28 with a fluxing agent that cleans off the graphite sufficiently enough to allow wetting (such as the black type fluxes AWS FB3-C or AMS 3411). Another solution is to pre-clean the graphitic scroll part in a separate step prior to brazing. Another solution is to use a braze material such as BNi-7 (a nickel bearing alloy) that tends to wet well to cast iron-type materials. Other all alloys such as Bag-3, Bag-4, Bag-24 or RBCuZn type filler have also been used successfully on cast iron-type materials.

One such cleaner is fused salt. The fused salt process involves immersing the parts in a bath insulated from the tank and a direct current is imposed and the polarity is set to oxidized or reduce the surfaces to be cleaned. Both graphite and oxides can be removed if necessary depending upon the polarity. For economic reasons, the preferred situation is to be able to conventionally clean the gray iron casting scroll such as in an alkaline water based cleaner prior to brazing.

Another way to clean the surfaces is by abrasive blasting with nickel or steel shot for example.

Another challenge to brazing powdered metal is that braze material 28 tends to excessively wick into the porous powder metal part. If excessive, this can cause a poor braze joint because the braze material 28 becomes removed from the joining surfaces. A solution to this is to use a braze material 28 that minimizes wicking effect. The required braze alloy must react with the powder metal surface. This reaction minimizes the amount of wicking that occurs by producing a metallurgical compound that melts at a higher temperature than the current brazing temperature. One such braze alloy is SKC-72 which has the composition by weight of 30–50% copper, 10–20% manganese, 3–25% iron, 0.5–4% silicon, 0.5–2% boron, and balance (30–50%) nickel. Good green strength and acceptable levels of base metal dissolution are satisfied by the addition of certain elements especially iron.

The braze material 28 may be wrought form, a paste or a metal powder, or cast preform, or preferably a solid powder metal preform slug placed into a baseplate groove 25 on the baseplate 12 prior to brazing or in the hub groove 29. Care when using pastes must be exercised to ensure that gas does not develop during brazing. The brazing method may be locally resistance heated or furnace brazed. Resistance brazing has the advantage that minimal heat related distortion will take place because the heating is localized. Furnace brazing has the advantage of being able to braze in a protective atmosphere which will aid in wetting. Also, brazing may be performed simultaneous to sintering which would be economically beneficial.

FIG. 7*d* shows a brazement 28 configuration with optional chamfers 26. Although a flat strip is shown, other forms of braze may be used such as wire, preformed parts, or paste (with or without flux). Joint clearances shall be in accordance with standard AWS practice for the type of braze alloy used. For example, for the SKC-72 alloy mentioned herein, the optimal joint gap shall be between 0.002 and 0.005 inch. The (preferred) "powdered metal slug" shall have a density of about 4.5–6.5 grams/cc and, more preferably, about 5.5 grams/cc. The density of the powdered metal preformed slug is important to achieve good brazeability.

Shown in FIG. 7*e* is the placement of braze material 28 on top of the baseplate 12 after the involute scroll form 10 has been inserted into the baseplate groove 25 . Capillary action will then draw the braze material 28 into the gap 30 and around the bottom 32 of the involute scroll form 10. Optionally, the involute scroll form 10 and baseplate 12 can be molded together, but the bearing hub 16 is made separately and is joined to the baseplate 12.

FIG. 3*b* depicts the coupling of the bearing hub 16 to the baseplate 12, which are made as one piece via powder metallurgy techniques as shown in FIG. 3*a*. The bearing hub 16 is made as a separate powder metal piece and joined to the scroll/baseplate assembly via brazing methods already discussed. In this approach, the bearing hub 16 may be conventional steel, powdered metal, or cast iron.

The methods disclosed herein are described as methods of forming involute portion of a scroll for a scroll compressor. The metal injection molding process disclosed uses a very fine iron powder in which the powder particles are coated with a polymer "binder". The powder/polymer combination ("feedstock") is then heated and by the use of an injection molding machine, injected into a mold die to form the scroll. The binder functions as a carrier to help facilitate injection molding. The basic procedures of metal injection molding are similar to plastic injection molding. Molding pressure and temperature are optimized for the particular powder/binder system used to allow proper filling of the involute scroll form. The conditions within the injection system are thixotropic in nature (viscosity decreases as the shear stress induced heat by the injection process increases). The resultant as molded scroll is then debound (binder removal) and then sintered (to complete densification). These two steps may be combined or done at separate operations. The specific process path and materials used are chosen to minimize dimensional variation (tolerances) and minimize geometric shape distortion. As linear dimensional tolerances are expected to be about 0.3%, no stock allowance for "skin effects" is needed. Die draft angles are about 0.5 degrees.

To reduce costs, it is preferred that an iron powder with the largest average particle size possible is used (about greater than 5 micrometers). Particle sizes of between about 2 and 20 micrometers allow reasonable sintering times and allow proper moldability. Round particles pack more tightly, sinter faster and require less binder, but do not retard shape distortion as well during debinding and sintering. Irregularly shaped powder particles hold part shape better than spherical. Spherical particles have higher tap density (highest density achieved after vibrating a powder sample to minimum volume). Although 100% irregularly shaped and larger particles have economic advantages, it may be necessary, because of processing difficulties, to use a blend or distribution of particle sizes that have both spherical and irregularly shaped morphologies. Either 100% spherical, 100% irregularly shaped or some proportion of each may be used.

The correct feedstock viscosity must be used to form the involute scroll form. Higher metal loading produces higher viscosity feedstocks. If the viscosity is too high, the material can not be injection molded. However, a very low viscosity can make a feedstock prone to metal binder separation during injection molding.

There are several binder systems envisioned for use in the scroll formation process: wax-polymer, Acetyl based, water soluble, agar water based and water soluble/cross-linked. "Acetyl" based binder systems have as main components polyoxymethylene or polyacetyl with small amounts of polyolefin. The acetyl binder systems are crystalline in nature. Because of the crystalinity, the molding viscosity is quite high and this requires close controls on the molding temperature. This binder is debound by a catalytic chemical de-polymerization of the polyacetyl component by nitric acid at low temperatures. This binder and debinding process is faster particularly for thicker parts. Molding temperatures are about 180° C. and mold temperatures are about 100–140° C., which is relatively high.

It is further envisioned that a "wax-polymer" binding system may be used. This binding system has good moldability, but since the wax softens during debinding, distortion is a concern. Fixturing or optimized debinding cycles are needed and can overcome this. It is envisioned that a multi-component binder composition may be used so that properties change with temperature gradually. This allows a wider processing window. Wax-polymer systems can be debound in atmosphere or vacuum furnaces and by solvent methods. Typical material molding temperatures are 175° C. and mold temperatures are typically 40° C.

It is further envisioned that a "water soluble" binder may be used. "Water soluble" binders are composed of polyethylene with some polypropylene, partially hydrolyzed cold water soluble polyvinyl alcohol, water and plasticizers. Part of the binder can be removed by water at about 80–100° C. Molding temperatures are about 185° C. This system is environmentally safe, non-hazardous and biodegradable.

Because of the low debinding temperatures, the propensity for distortion during debinding is lower.

It is further envisioned that "agar-water" based binders be used. Agar-water based binders have an advantage because evaporation of water is the phenomenon that causes debinding, no separate debinding processing step is needed. Debinding can be incorporated into the sinter phase of the process. Molding temperature is about 85° C. and the mold temperature is cooler. One caution is that during molding, water loss may occur that affects both metal loading and viscosity. Therefore, careful controls need to be incorporated to avoid evaporation during processing. Another disadvantage is that the as molded parts are soft and require special handling precautions. Special drying immediately after molding may be incorporated to assist in handling.

It is further envisioned that a "water soluble/cross-linked" binder be used. Water soluble/cross-linked binders involve initial soaking in water to partially debind, and then a cross-linking step is applied. This is sometimes referred to as a reaction compounded feedstock. The main components are methoxypolyethylene glycol and polyoxymethylene. This binder/debinding system results in low distortion and low dimensional tolerances. Also, high metal loading can be achieved when different powder types are blended.

Optionally, fixturing during debinding and/or sintering to help prevent part slumping. It has been found that "under-sintering" (but still densifying to the point where density/strength criteria are met) helps to maintain dimensional control. Fixturing may be accomplished by using graphite or ceramic scroll form shapes to minimize distortion.

The design geometry of the scroll must be optimized for metal injection molding. The wall thickness shall be as uniform and thin as possible throughout the part, and coring shall be used where appropriate to accomplish this. Uniform and minimal wall thickness minimizes distortion, quickens debinding and sintering, and reduces material costs.

It has been found that the metal injection molding process disclosed produces a very dense part (often in excess of 7.4 specific gravity). This is a unique aspect of metal injection molding and produces exceptionally high strength material which would allow for thinner and lighter scrolls than the current cast iron design. Metal injection molding therefore affords strength advantages over the prior art gray cast iron scrolls.

The final sintered density of the scroll part (fixed and orbital) shall be about 6.5 gm/cm$^3$ minimum (preferably 6.8 gm/cm$^3$ minimum). The density shall be as uniformly distributed as possible. The density minimum must be maintained to comply with the fatigue strength requirements of the scroll. Leakage through the interconnected metal porosity is also a concern because of loss in compressor efficiency. The incorporation of higher density with no other treatments may be sufficient to produce pressure tightness. Also, impregnation, steam treatment or infiltration (polymeric, metal oxides, or metallic) may be incorporated into the pores to seal off interconnected pores, if necessary.

The material composition of the final part shall be about 0.6–0.9% carbon (3.0–3.3% when free graphite is present), 0–10% copper, 0–5% nickel, 0–5% molybdenum, 0–2% chromium and remainder iron. Other minor constituents may be added to modify or improve some aspect of the microstructure, such as hardenability or pearlite fineness. The final material microstructure shall be similar to cast iron. Although, a graphite containing structure may be needed depending upon the tribological requirements of the compressor application, the preferred microstructure for the powder metal shall contain no free graphite. The presence of free graphite decreases compressibility of the powder and adversely affects dimensional accuracy and tolerances. It is conceivable that one scroll (e.g., the fixed) contains graphite and the orbital does not. The sintering cycle preferably would be performed such that the final part contains a matrix structure that is 90% pearlite minimum by volume (discounting voids), If free graphite is present, it shall be either in a spherical, irregularly shaped, or flake form. The volume percent free graphite is preferably between 5% and 20%. Preferably about 10–12% graphite. Graphite particle size (diameter) shall be about 40–150 microns in effective diameter.

The particles may be concentrated at specific sites on the scroll that require special tribological properties (see U.S. Pat. No. 6,079,962 hereby incorporated by reference). Or, more preferably shall be dispersed evenly throughout the scroll. Particle size, shape and dispersion shall be complied with to maintain acceptable fatigue resistance and tribological properties (low adhesive and abrasive wear). The powder metal herein shall be capable of being run against itself without galling in the compressor. The presence of graphite within at least one of the mating scrolls allows for this wear couple to successfully exist. The dimensional change effects from the addition of graphite, if incorporated, must be accounted for in the design of the metal injection molding or powder metal tooling.

To maintain free graphite in the final powder metal structure, two or more different size distributions (fine and large) of graphite particles are optionally admixed. The finer graphite particles diffuse during sintering and form the pearlite. The more coarse graphite particles remain or partially remain as free graphite. Care in thermal processing must take place as to not form free carbides, which severely degrade machinability. Optionally, free graphite may be formed by coating the graphite that is required to remain in the free state with an metal such as copper or nickel. The metallic coatings prevent or at least minimize carbon diffusion during sintering.

In general, powder metal or MIM (metal injection molded) scroll components machine with more difficulty than wrought or casting components. Reduced machinability of powder metal is caused by the porosity, which produces micro-fatigue of the cutting tool and poor heat dissipation away from the cutting tool. To enhance machinability, composition is one that contains graphite, and has higher density. The optional incorporation of manganese and sulfur in stoichiometric quantities to form manganese sulfide assists machinability also. Approximately 0.5% manganese sulfide has been used to achieve acceptable machinability. It has been found that steam oxidizing in addition to adding manganese sulfide may produce an improved surface finish because of an interaction between the processes. The preferred approach to maintain good tool life (machinability) is to seal (impregnate) the powder metal scroll with a polymer. The voids become filled. The polymer improves machinability by lubricating the tool as it machines and also minimizes micro-fatigue phenomenon because the voids are filled. The polymer form to be acceptable is a methacrylate blend with unsaturated polyesters. Either heat or anaerobic type curing works well. Anaerobic alloy cured sealers are ideally suited because the internal void in powder metals lack oxygen.

It is not necessary to produce the baseplate 12 with a high precision manufacturing process because the involute scroll form 10 is the most difficult and expensive section of the scroll to machine. Hence, while the baseplate 12 can be made with conventional sand casting techniques, such as vertically parted processes, the involute of the scroll can be produced with powder metal technology. One such casting process, DISA (vertically parted green sand), may be used for its relative economic advantages compared to other cast iron casting processes.

Maintaining dimensional accuracy and avoiding distortion during the molding and sintering of the involute scroll form 10 and its tooling (dies and punches) is critical. It is envisioned that one or a combination of the following powder metal enabling technologies may be needed to control involute tool distortion.

In "warm compaction", a specially bonded powder material is used that has exceptional flow characteristics when heated. The powder and die are heated up to about 300° F. (prior to and during molding). Warm compaction makes a stronger green powdered metal part with a higher and more uniform density condition within the green part as well as final sintered part. The higher density uniformity reduces the chance of sinter distortion. Moreover, the warmly compacted green compact is stronger than traditionally molded parts and will, therefore, not crack as easily during handling. Warm compacting the involute scroll form 10 will also allow the molded part to be removed from the die more easily, thereby reducing ejection rejects. Another unique advantage of warm compaction is that it allows the machining of the green (as pressed) part, sometimes called green machining. Two advantages exist which are easier machining because the parts are not yet sintered to full strength, and stronger green parts for easier handling and chucking.

Another processing aid for the involute scroll form 10 powder metal production is "die wall lubrication". In this technique, the wall of the die is coated with a special lubricant, which is either a solid spray or liquid form, and is stable at high temperatures. This lubricant reduces powder-to-die wall friction, which can improve density and flow characteristics of the powder. Moreover, die wall lubrication can be used as a replacement (or partial replacement) to lubrication within the powder (internal lubrication). Internal lubrication may use about 0.75% lubrication, whereas die wall lubrication results in about 0.05% internal lubrication. Lower amount of internal lubrication results in higher densities, better density distribution, less sooting in the furnaces, greater green strength, less green state spring back after compaction, better surface finishes, and less ejection forces required. The die wall lubrication may be a liquid or a solid.

The die wall may need to be heated to a temperature to about 300° F. to liquefy the lubricant. Liquefied lubricant produce less metal friction. As a variant to this, the die wall lubrication may be a variety that has a low melting point (possibly as low as 100° F.). Under these properties, the die wall lubricant can be easily transformed to a liquid during the compaction process. Mixing high and low temperature lubricants may bring the effective melting point of the blend down to below the value of the highest melting point constituent as long as the temperature used is higher than a certain critical value. The lubricant powder must be well mixed prior to spraying into the die cavity. Fluidization is an acceptable way to accomplish this. Blending of different melt temperature lubricants also assists the fluidization effect. With blends, care must be taken as to not cause physical separation of the blended lubricants during fluidization. One such combination of lubricants is composed of ethylene bis-stearamide (EBS), stearic acid, and lauric acid.

Another technique to facilitate involute scroll form 10 powder metal manufacturing is to size or "coin" after sintering. This process entails repressing the sintered part in a set of dies that refines the dimensional accuracy and reduces dimensional tolerances relative to the as sintered part. This brings the part even closer to net shape and somewhat strengthens it.

A concept which avoids the complications of high stresses on the dies and punches is to use "liquid metal assisted sintering". The pressed green form is made of the same composition as described above, only with lower pressure than normal producing less density and a higher level of porosity. The lower pressing pressures apply less stress on the dies increasing die life and ejection problems. Then, during sintering, about 10% by weight copper alloy is melted throughout the part. The molten copper alloy enhances the rate of sintering. In the final sintered part, the copper alloy brings the strength of the part back up. Without the copper alloy, the under pressed part would not be strong enough. As a side benefit, the copper dispersed within the resulting part may aid the tribological properties during compressor operation. Liquid metal assisted sintering, however, increases the amount of distortion in the scroll after sintering.

Fixturing during sintering or brazing may be needed to minimize dimensional distortion. Fixturing may be accomplished by using graphite or ceramic scroll forms that help to maintain the scroll wrap shape. Other fixture configurations, such as spheres that could be placed in between the scroll wraps to support them may be used. Also, since the part shape and size changes during sintering, frictional forces between the part and the holding tray are important. It may be necessary to increase or decrease friction depending upon the reason. Decreasing friction is the most common way to reduce distortion and may be accomplished by applying alumina powder between the parts and tray.

Consistency and uniformity of powder and part composition can also minimize dimensional tolerances. Segregation during feeding of powder can occur. Powder feeding and transfer mechanisms that avoid powder segregation are critical. One way to avoid this is to use pre-alloyed or diffusion bonded powder. In these cases, each particle of powder has the same composition so segregation becomes mute. Another simple way to avoid this is to fill as fast as possible. Choice of binder and resultant powder flow affects dimensional stability (sinter distortion) by reducing the density variation along part. Powder flow should be high enough to produce uniform density from thick to thin sections, but not too high to encourage particle size segregation. Here again high temperature binders work better to prevent flow problems.

Adequate process controls on all critical steps in the manufacture of powder metal scroll components can also affect dimensional accuracy and tooling distress. Two examples of such a critical step to monitor are the green part properties (density, and dimensions) and sintering temperature oven uniformity within a load.

The dies themselves can be permanently coated with lubricant to minimize friction. Coatings such as diamond or chromium have been used. Die coatings allow less lubricant to be needed in the powder which reduces blisters and increases green strength and compressibility as stated above in the die wall lubrication section.

Material choice is critical to minimize distortion. It is critical for dimensional stability to choose the alloying elements with the optimum ratio: e.g., carbon and copper must be proportioned so that a higher copper content (about 3–4%) is avoided especially when carbon concentration is low (less than 0.6%). Moreover, the choice of powder alloy manufacturing methods is critical. Diffusion or bonded alloying methods are preferred because of the uniformity and consistency of composition that results compared to admixed versions. Alloys similar to MPIF FD-0408 or FC-0208 may be well suited for scrolls from a dimensional perspective.

Complete die filling with powder is essential. To allow the powder to completely fill the die, techniques such as vibration, fluidization, or vacuum may be used to help transport the powder into the scroll form cavity. Segregation of powder must be prevented during vibration as previously mentioned. Bottom feeding or bottom and top feeding of the powder may also be necessary to achieve this end.

In another embodiment of the present invention, the entire scroll would be molded as solid shapes of simple geometry. Then, in the as molded or "green" state, the involute scroll form 10, hub 16, and baseplate 12 details would be machined in. The scroll would then be sintered as normal. The scroll would then be used as is or some final machining would be needed to compensate for sintering distortion. With computer assisted machining processes, large amounts of machining that this embodiment requires is feasible.

The green solid involute scroll form 10 would be made from a process and material that allows sufficient green strength to support the machining stresses and the associated clamping stresses required to machine it. In this case, the powders are coating with a binder that can withstand the higher compacting temperatures up to about 300° F. The tensile strength of the green part should be 3000 psi minimum for this embodiment.

Figure 8:
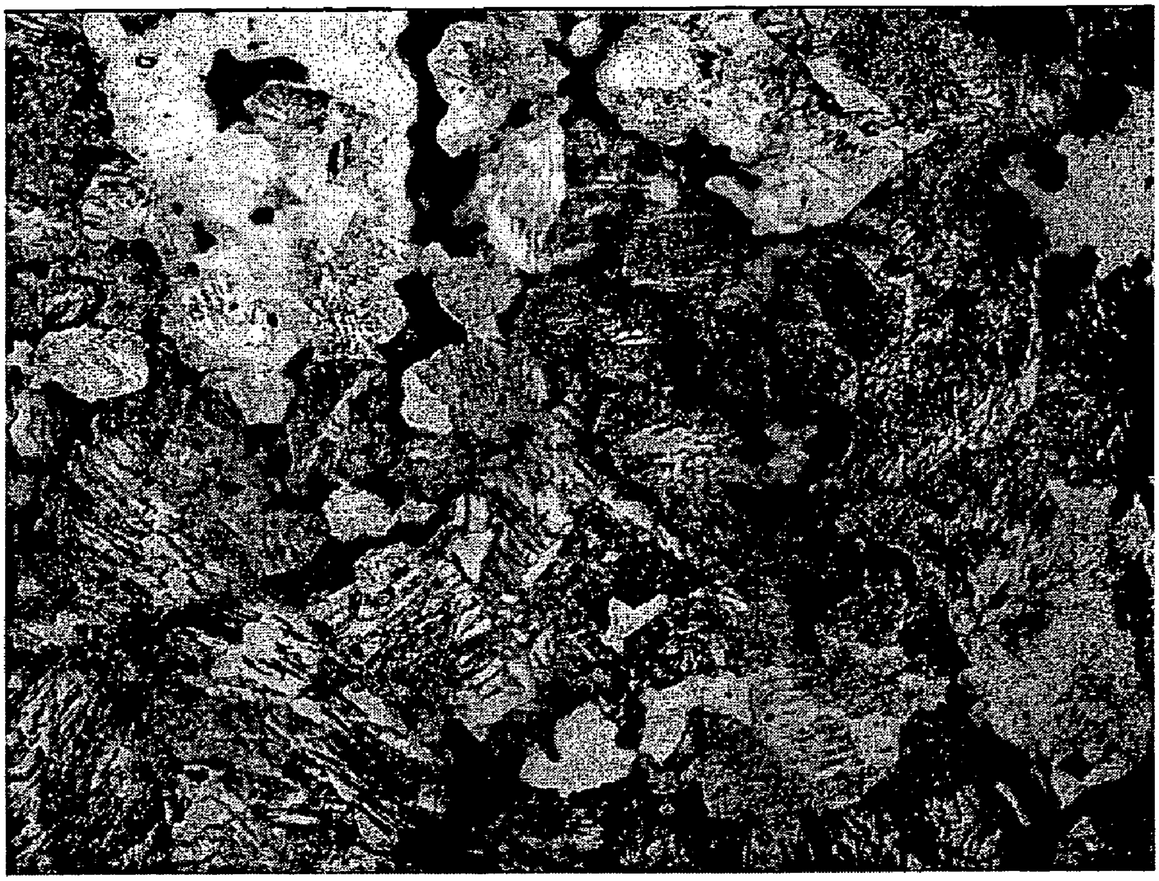
FIGS. 8–10 are micrographs of the metallurgical structure of the scrolls of the present invention.
Figure 9:
Figure 10:
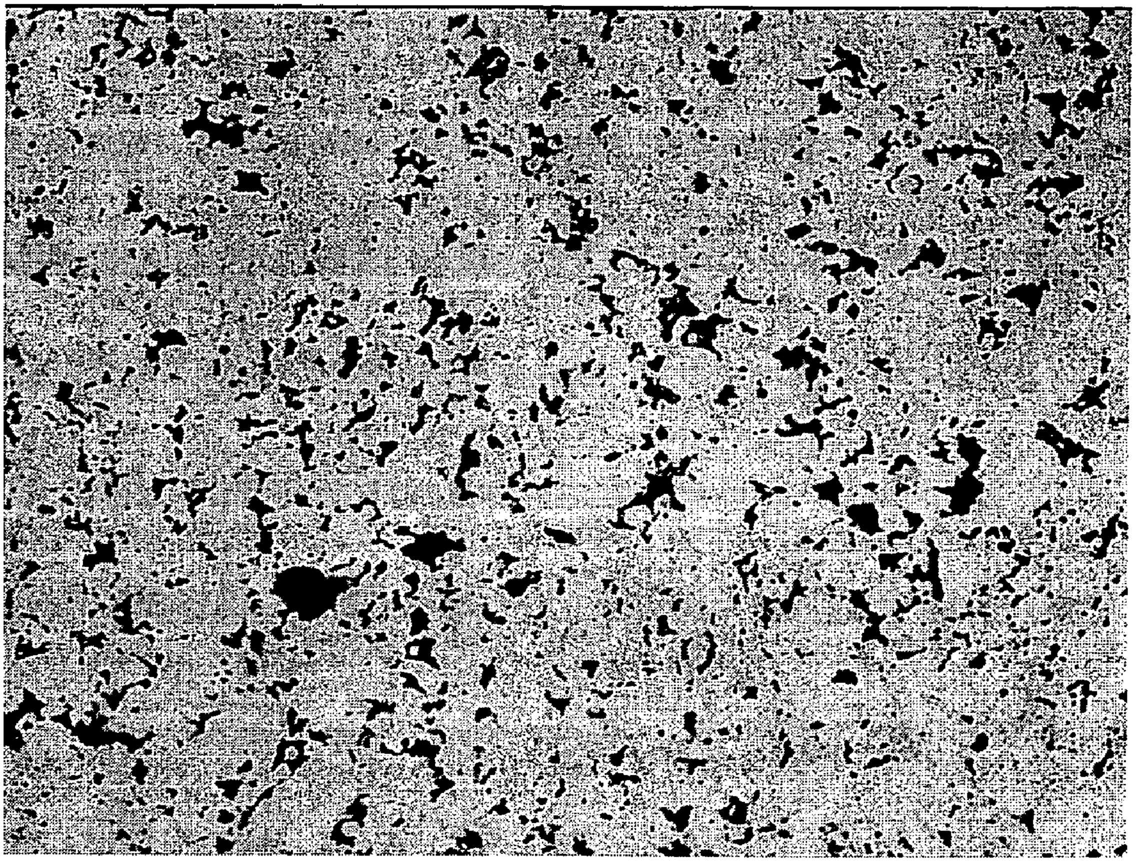

FIGS. 8–10 represent micrographs of the scroll components of the present invention. FIGS. 8-9 represent the baseplate and tip of the involute scroll form respectively at 500× magnification. Shown is the pearlitic structure with no graphite structures present. FIG. 10 represents the powder metal involute scroll form at 100× in an unetched state. Visible is the porosity in the sintered material. The polymer sealer resides within the porosity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for forming a scroll component comprising the steps of:

providing a metallic powder;

providing a first mold defining an involute scroll form cavity;

providing a second mold defining a hub cavity;

introducing said metallic powder into said first mold to form a green involute scroll form;

introducing said metallic powder into said second mold to form a green involute hub form;

removing said green involute scroll form from said first mold;

removing said green hub form from said second mold;

coupling green hub to said green involute scroll form; and sintering said green involute scroll form to said hub form to form an involute scroll component.

2. The method of claim 1 further comprising the steps of:

providing a binder; and combining the metallic powder with said binder to form a mixture.

3. The method of claim 1 wherein providing a metallic powder includes providing a powder comprising iron.

4. The method of claim 3 wherein providing a powder comprising iron further comprises providing a powder comprising elements selected from the group carbon, nickel, molybdenum, chromium, copper and mixtures thereof.

5. The method of claim 1 wherein providing a metallic powder is providing an iron powder having a mean diameter greater than 5 micrometers.

6. The method of claim 3 wherein providing a metallic powder comprising of iron includes providing a powder having elements selected from the group of 0.7–3.5% carbon, 0–10% copper, 0–5% nickel, 0–5% molybdenum, 0–2% chromium and mixtures thereof.

7. The method of claim 1 wherein sintering said green involute scroll form is sintering said green involute scroll form until said involute scroll form comprises at least 90% per volume pearlitic structure.

8. The method of claim 1 wherein sintering said green involute scroll form is sintering said green involute scroll form until said involute scroll form comprises 0–20% free graphite.

9. The method of claim 8 wherein said involute scroll form comprim about 12% free graphite.

10. The method of claim 1 wherein providing a metac powder includes providing iron powder having a plurality of morphologles having at least two average diameters.

11. The method of claim 1 further including the steps of:

providing metal coated graphite particles; and mixing said graphite particles with said metallic powder.

12. The method of claim 11 wherein providing metal coated graphite particles includes providing graphite particles coated with copper.

13. The method of claim 1 further including the steps of providing magnesium sulfide; and mixing said magnesium sulfide with said metallic powder.

14. The method of claim 1 further including the step of machining said green involute scroll form after it is removed from said mold.

15. The method of claim 1 wherein sintering said green involute scroll form is sintering said green involute scroll form until said involute scroll form has a density of more than about 6.8 gm/cm$^3$.

16. The method according to claim 1 further comprising introducing a polymer into the involute scroll component.

17. The method according to claim 16 further comprising machining the involute scroll component.

18. A method for forming a scroll component comprising the steps of:

introducing metal powder into a first mold defining a first cavity having involute and base plate portions to form a green involute scroll form;

introducing metal powder into a second mold defining a hub shaped second cavity to form a green hub form;

placing the green hub form in contact with the green involute scroll form; and simultaneously sintering the green involute scroll form and the green hub form to form an one-piece scroll component.

19. The method according to claim 18 further comprising introducing a polymer into pores of the scroll component.

20. The method according to claim 19 wherein introducing the polymer into pores of the scroll component occurs after the simultaneous sintering of the green involute scroll form and the green hub form.

21. The method according to claim 19 further comprising machining the scroll component.

22. The method according to claim 18 further comprising the steps of:

providing a binder; and combining the metal powder with said binder prior to introducing the metal powder into the first mold.

23. The method according to claim 18 wherein said metal powder comprises iron.

24. The method according to claim 18 further including mixing said metal powder with graphite particles.

25. The method according to claim 18 wherein the metal powder is an iron powder having a mean diameter of greater than 5 micrometers.

26. A method of forming a scroll component comprising the steps of:

forming a green powder metal scroll member having involute and base portions;

forming a green hub form;

placing the hub form in contact with the base portion;

simultaneously sintering the green involute scroll member and green hub form to mate the scroll member to the hub; and introducing a polymer into pores of the scroll component.

27. The method according to claim 26 wherein introducing the polymer into pores of the scroll component occurs after the simultaneous sintering of the green involute scroll form and the green hub form.

28. The method according to claim 27 further comprising machining the scroll component after the sintering of the involute scroll form and the green hub form.

* * * * *